Sept. 14, 1926.

D. F. HYLAND

SPEEDOMETER

Filed July 30, 1923

1,599,768

Inventor:
DANIEL F. HYLAND.

Patented Sept. 14, 1926.

1,599,768

UNITED STATES PATENT OFFICE.

DANIEL F. HYLAND, OF ST. LOUIS, MISSOURI.

SPEEDOMETER.

Application filed July 30, 1923. Serial No. 654,594.

This invention relates to speedometers, such as are used on motor vehicles, and similar devices, and it is more particularly directed toward means for showing when such a vehicle has been improperly driven.

Automobile trucks and similar vehicles are often driven by hired chauffeurs who are not the owners of the vehicles. Most trucks are designed to operate normally at a moderate speed and, while capable of running at greatly increased speeds, the normal operation thereof does not contemplate use at a high speed for any considerable length of time. Consequently excessive wear and sometimes actual damage may result from habitually driving the car at an excessive speed. It is desirable, therefore, to provide means which will disclose the fact that a chauffeur has been driving his car at too high a speed so that a chauffeur who cannot be trusted to handle his car properly can be detected and properly dealt with.

One of the objects of this invention, therefore, is to provide a speedometer which, while indicating the speed at which the car is running in a usual manner, will also indicate when the car has been driven at an excessive speed.

Another object of this invention is to provide such an instrument which after indicating such an excessive speed will maintain such an indication until reset by some authorized person.

Further objects will appear from the detail description taken in connection with the accompanying drawing, in which.

Figure 1:
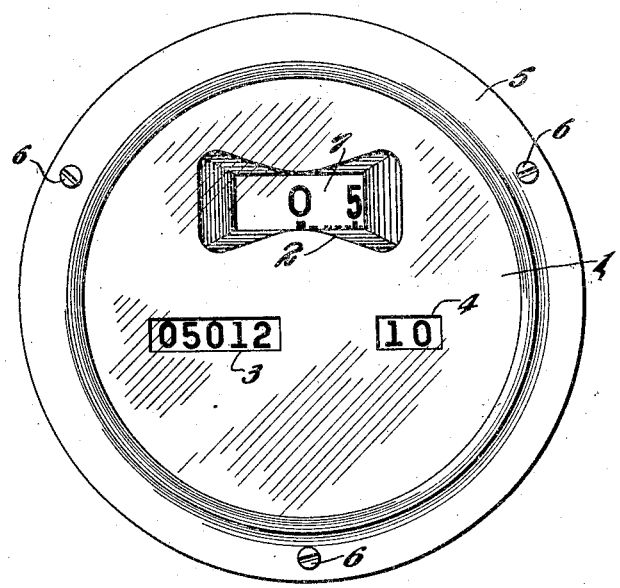
Figure 1 represents a front view of a speedometer embodying this invention.

Referring to the accompanying drawing, the speedometer may be of any ordinary type, such as shown in Figure 1, which shows the front view of a speedometer which as usual is ordinarily mounted on the dash of an automobile and is provided with a front plate 1 having a suitable perforation 2 through which the speed indicating dial may be viewed and perforations 3 and 4 adapted to disclose the mileage indication. The front may be enclosed by a glass cover having a rim 5 secured by means of screws 6 in the usual manner. These screws may be provided with suitable seals to prevent unauthorized tampering therewith.

In the ordinary construction of such a speedometer, the speed indicating element or dial 7 is provided usually in the form of an inverted cylindrical cup having the speed indicating circle marked on its cylindrical surface. This dial is mounted on a spindle 8 suitably pivoted in the mechanism and controlled by a spring 9, the inside end of which may be connected to the spindle and the other end suitably anchored to a stationary part of the mechanism as, for instance, to a lug 10 on the top plate 11 which carries the upper bearing 12 for the spindle 8. The dial 7 may be provided with a lug 13 adapted to be urged against a suitable stop 14 and the plate 11 by the spring 9. The spring normally holds the dial in position with the lug 13 against the stop 14 when the car is at rest. This normal position is indicated as the " 0 " position in Figure 1.

Figure 3:
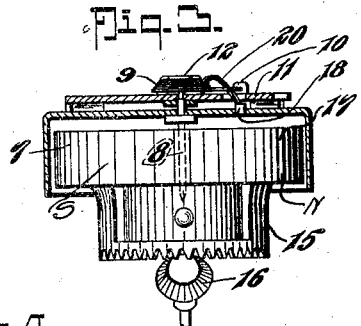
Figure 3 is a partial section taken approximately on line 3—3, Figure 2.
Figure 4:
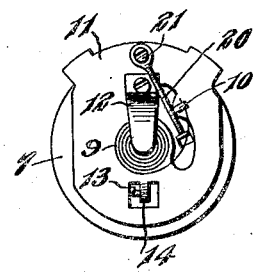
Figure 4 is a plan view of the mechanism above the dial.

Suitable mechanism for driving the dial 7 to indicate the speed of the car is provided as, for instance, the rotating element 15 suitably driven by driving mechanism 16, not shown in detail, which is connected with the wheels or other moving part of the car, whose motion is proportionate to that of the car. The element 15 may be pivoted for rotation on the vertical spindle, not shown, and may carry a permanent magnet 17 of the horse-shoe type but formed as a circular ring having poles N and S on opposite sides of a slit or gap in the ring. The magnet 17 is positioned inside of the cup of the dial 7 so that the cylindrical portion of said dail overhangs the magnet as indicated in Figure 3. When the magnet 17 is driven in rotation by the movement of the car, its motion with respect to the metal dial 7 will generate in that dial eddy currents which reacting on the rotating magnet will tend to carry the dial along with the magnet. A torsional effort is thereby applied to the dial tending to rotate the same on its spindle 8 against the resistance of the spring 9. Since the pull exerted by the magnet 17 on the dial is proportional to the speed of rotation, the deflection of the dial 7 will also be proportional to that speed and its indications will vary accordingly. The parts so far described may be of any well known construction suitable for the purpose and are all well known in the art, so that description in further detail will be unnecessary.

Figure 2:
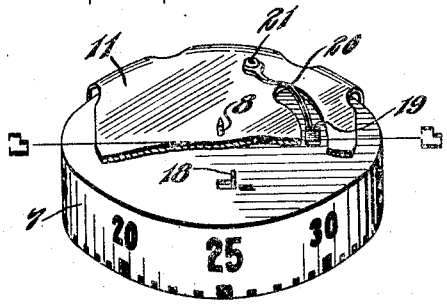
Figure 2 is a detail showing the indicating dial.

In accordance with this invention the dial 7 may be equipped with one or more stops 18 and 19 adapted to be engaged by a catch 20 mounted on the top plate 11. The stops 18 and 19 may be formed by bending up punched out portions of the dial cup. The catch 20 is shown as a spring mounted by means of a screw 21 on the plate 11. The stops 18 and 19 and the catch 20 are so positioned relatively to one another that when the dial moves to successive speed indicating positions, the stop 18 will first pass under the catch 20 which yields to allow such passage, and thereafter snaps behind the stop 19 so as to prevent the return of the dial to normal position. The stop 18 may be positioned for instance to arrest the dial after passing the indication corresponding to say fifteen miles per hour. The stop 19 may be positioned so as to arrest the dial at a higher indication as, for instance, twenty-five miles per hour as shown in Figure 2. After the dial has moved beyond one of these speeds, one or the other of the stops will be held by the catch and prevent the dial from returning to normal, though still free to move beyond the stop, and this condition will be maintained until the dial is released by manually lifting the catch 20. Since the mechanism is entirely enclosed by a suitable casing as in the ordinary practice, the casing may be provided with the necessary seals to prevent unauthorized access to the mechanism. The driver of the car is, therefore, unable to obliterate the indication which shows that an excessive speed has been reached by his car some time during the day's operation. When the car is brought in at night, an authorized person may open the casing and release the dial to normal position. In this way an indication of the fact that the car has been driven at an excessive speed is preserved until it can be examined by a properly authorized person and the driver who habitually abuses his car can thus be detected.

It is obvious that various changes may be made in details of construction without departing from the spirit of this invention; it is, therefore, to be understood that this invention is not to be limited to the specific details shown and described.

Having thus described the invention, what is claimed is:

1. In a speedometer, speed indicating mechanism including a dial which is freely movable to variant speed indicating positions and returns to normal, and means adapted to retain said dial, against return to normal, at a predetermined indicating position, in order to indicate that a certain speed has been exceeded.

2. In a speedometer, speed indicating mechanism including a dial which is freely movable to variant speed indicating positions and returns to normal, a stop on said dial, and a catch cooperating with said stop adapted to retain said dial, against return to normal, at a predetermined indicating position, in order to indicate that a certain speed has been exceeded.

3. In a speedometer, speed indicating mechanism including a dial which is freely movable to variant speed indicating positions and returns to normal, and means adapted to retain said dial, against return to normal, at a predetermined indicating position, while permitting movement of the dial beyond such position, in order to indicate that a certain speed has been exceeded.

4. In a speedometer, speed indicating mechanism including a dial which is freely movable to variant speed indicating positions and returns to normal, a stop on said dial, and a yielding catch adapted to freely ride over said stop when moving in one direction, in order to retain said dial, against return to normal, at a predetermined indicating position, in order to indicate that a certain speed has been exceeded.

In testimony whereof I affix my signature this 10th day of July, 1923.

DANIEL F. HYLAND.